United States Patent [19]

Daisy et al.

[11] Patent Number: 4,758,478

[45] Date of Patent: Jul. 19, 1988

[54] FAST CURING PHENOLIC RESINS AND BONDING METHODS EMPLOYING SAME

[76] Inventors: Nick K. Daisy, 1766 Peck Dr., East Baton Rouge, La. 70810; Dale L. Leeper, 707 Edgewood, Lufkin, Tex. 75901

[21] Appl. No.: 913,477

[22] Filed: Sep. 30, 1986

[51] Int. Cl.$^4$ .................... B32B 21/08; C09J 5/02
[52] U.S. Cl. ................... 428/529; 156/307.3; 156/335; 528/147; 528/165
[58] Field of Search ............... 528/147, 165; 428/529; 156/307.3, 335

[56] References Cited

U.S. PATENT DOCUMENTS

| | | |
|---|---|---|
| 2,437,981 | 3/1948 | Stephen et al. . |
| 3,459,708 | 8/1969 | Steven . |
| 4,109,057 | 8/1978 | Nakamura et al. . |
| 4,239,577 | 12/1980 | Hartman et al. ............... 156/335 |
| 4,366,303 | 12/1982 | Kopf . |
| 4,474,904 | 10/1984 | Lemon et al. . |
| 4,514,532 | 4/1985 | Hsu et al. ............... 156/335 |
| 4,608,408 | 8/1987 | Hoo et al. . |
| 4,656,239 | 4/1987 | Waitkus et al. . |
| 4,668,759 | 5/1987 | Iyer et al. . |

FOREIGN PATENT DOCUMENTS

| | | |
|---|---|---|
| 2228803 | 1/1975 | France . |
| 122392 | 9/1979 | Japan . |
| 148823 | 11/1979 | Japan . |
| 0154493 | 12/1979 | Japan . |
| 0116717 | 9/1980 | Japan . |
| 0071323 | 4/1984 | Japan . |
| 0202113 | 10/1985 | Japan . |
| 982248 | 2/1965 | United Kingdom ............... 528/147 |
| 519431 | 8/1976 | U.S.S.R. . |

*Primary Examiner*—John J. Gallagher

[57] ABSTRACT

It has now been found that when there is a partial or complete replacement of the sodium hydroxide that is used to make a sodium phenolate resole resin by a molar equivalent of potassium hydroxide, a far faster curing resin is obtained. Such potassium-modified phenoli resins exhibit significant improvement in cure speed without loss of flowability. To the contrary, these resins act as though they were lower molecular weight condensation products. Reduced application rates are possible. The combination of faster cure and lower application rates has allowed such resins to be used as effective adhesives for plywood, for example, with veneer and interior plies having a higher moisture content than was previously possible. Generally, resins according to the invention may contain from about 1% to about 15%, and preferably from about 1% to about 7% by weight, of potassium hydroxide, or more.

40 Claims, No Drawings

– –

FAST CURING PHENOLIC RESINS AND BONDING METHODS EMPLOYING SAME

RELATED APPLICATION

This application discloses and claims subject matter that is related to the subject matter disclosed in U.S. patent application Ser. No. 903,253, filed Sept. 3, 1986, in the name of Wm. Detlefson, et al., for Process for Bonding Lignocellulosic Material, which is incorporated herein by reference.

FIELD OF THE INVENTION

This invention relates to an improved phenolic resin that is useful as an adhesive binder for the manufacture of particleboard, plywood, and the like.

BACKGROUND OF THE INVENTION

Phenolic resins for the wood industry have been refined for the past twenty years to the current "state of the art" and as such, perform to a well defined standard. The recent development of isocyanates have provided wood adhesives that are far faster curing than phenolics and are replacing phenolics on an ever increasing basis due to their faster cure rates, even though they have negative health and economic aspects.

However, phenol-formaldehyde resins remain widely used as adhesives and binders in many wood products, including structural wood products such as plywood, particleboard, fiberboard, hardboard and oriented strandboard. The productivity of most mills manufacturin structural wood products using liquid phenol-formaldehyde resole (PF) binders is limited by the cure speed of the binder in the hot press. This is because of the inherently slow thermal cure of these products, compared to other commonly used binders, and because of the need to eliminate moisture from the system during curing.

Plywood is a glued-wood panel that is composed of relatively thin layers, or plies, with the grain of adjacent layers at an angle to each other (usually 90°). The usual constructions have an odd number of plies to provide a balanced construction. If thick layers of wood are used as plies, often two corresponding layers with the grain directions parallel to each other are used; plywood that is so constructed often is called four-ply or six-ply. The outer pieces are faces or face and back plies, the inner plies are cores or centers, and the plies between the inner and outer plies are crossbands. The core may be veneer, lumber or particleboard, the total panel thickness typically being not less than one eighth inch nor more than two inches.

In general, the plies are dried to remove moisture to a level which is compatible with gluing. The plies are coated with a liquid glue, front and/or back as appropriate, with a glue applicator. Heat and pressure are applied in a hot press to cure the glue and bond the panels together to form the plywood.

Dry process composition board is a common form of composite panel. It may be made from wood fibers. In the manufacture of the board, raw wood is broken down to a fibrous form, sprayed with an appropriate adhesive, and then formed into a mat by a sifting or dry forming technique. This mat is then subjected to a high pressure and an elevated temperature to compact the mat to the desired density, commonly 40–60 lbs./ft.$^3$. In this hot pressing operation, the high temperature causes the resin to harden and to form an adhesive bond between the fibers.

In the preparation of particles used to make particleboard, a variety of materials may be employed. The board may be formed from a homogeneous type of particles. That is, all of the particles may be flakes, or all of them may be fibers. The board may be formed from a single layer or it may be multilayerd, with fine surface flakes applied over a core of coarse flakes, or there may be a coarse flake core having an overlay of fibers on each of its surfaces. Other combinations are also used.

In the manufacture of particleboard, an aqueous solution of a synthetic resin binder is sprayed on the wood particles in an amount of from about 6 to about 10 parts of resin solids per 100 parts of dry wood. The resin-treated particles are then formed into a mat, and compacted in a hot press to the desired density. This type of panel is usually made to have a density in the range from about 35 lbs./ft.$^3$ to about 45 lbs./ft.$^3$. Typically, the thickness of particleboard would fall in the range from about one-eighth inch to two inches.

This type of process is quite versatile. Materials that would otherwise be waste materials can be formed into desirable products. For example, planer shavings can be formed into useful particleboard by this process, used alone, or in combination with other wood particles.

The mat process has been refined and improved, so that it is now common to make a multiple-ply board. For example, three forming heads may be used. Each head effects the placement of flakes, fibers or particles that have had resin and wax sprayed onto them, on a moving wire, or caul plate. The first forming head lays down a fine surface material, the second lays down a coarser material for the center layer of the board, and the third head lays down another outer layer of fine surface material.

In addition to the mat-forming hot pressing process, an extrusion process is now in use. In this process, a mixture of wood particles, resin and a wax size is forced through a die to make a flat board. The extrusion process is commonly used for captive production by companies which produce the resulting composite panel for use in furniture cores.

Some modern processes make use of a combination of press curing with hot platens and heat generated by radio frequency electricity. This combination permits rapid curing with a minimum press time.

While the dry process techniques for manufacturing composite panels are entirely dependent onsynthetic resin adhesives, there are wet process techniques that can be used to make panels without any synthetic resin adhesive. However, often in actual practice themanufacturer of a wet process panel such as a hardboard will add a small amount of a synthetic resin binder in order to improve the properties of the product so that it can be used in demanding applications. Often the proportion of resin binder used is on the order of one-tenth to one-twentieth of the proportion used in the dry process.

In the mat-forming stage of the wet process, a slurry of fibers is drained on a screen to form a wet mat. Often the mat is produced as an endless ribbon and cut into the desired panel size for curing.

In the manufacture of hardboard, the wet mat is treated somewhat differently than in the dry process. The wax emulsion, for example, is added in the wet end of the mat-forming machine. Enough emulsion, generally of paraffin wax, is used to add from about 0.3% to about 3.0% of wax to the fibers, dry basis. Similarly, when a resin binder is added in the wet process, it is generally added to the fiber slurry before the mat is formed. It may be precipitated onto the fibers by acidfying the slurry with alum.

Wet process techniques are often also used in the production of insulation board. This kind of product emphasizes a low density structure that combines thermal insulating and sound-absorbing properties in a composite panel type of product. With the addition of synthetic resins and other additives, properties such as surface quality, strength and moisture resistance of insulation boards can be improved.

Normally, a phenolic resin is modified in its molecular weight to effect cure. Increasing the molecular weight will decrease the time required for complete cure; however, as the molecular weight increases, the mobility of flowability of the polymer is reduced. A phenolic resin must be mobile at the time of cure to be able to wet the adjoining substrate. Moisture is also an aid to phenolic resin flow; therefore, flowability is affected by the amount of adhesive applied and the dwell time allowed prior to hot-pressing. As long as sufficient moisture is present, the polymer will demonstrate adequate flowability; however, as the adhesive sets on the wood substrate, moisture will migrate away from the glue line and into the wood. If the dwell time prior to hot-pressing is excessive, or if conditions favor the absorption of water by the wood such as high ambient temperatures or low moisture wood, the resin will not show adequate flowability nor the ability to wet the substrate, and an inferior bond will result.

When a resin is designed for a given application, the molecular weight is usually selected by compromise to allow for sufficient flow of the resin with the constraints imposed by the user's process. If a faster cure is required, then a reduction in resin flow must be tolerated or accommodated by change in the manufacturing operations.

Increased formaldehyde concentration improves the cure speed of phenolic resins, but leads to excessive formaldhyde emissions.

SUMMARY OF THE INVENTION

It has now been found that when there is a partial or complete replacement of the sodium hydroxide that is used to make a sodium phenolate resole resin by a molar equivalent of potassium hydroxide, aa far faster curing resin is obtained. Such potassium-modified phenolic resins exhibit significant improvement in cure speed without loss of flowability. To the contrary, these resins act as though they were lower molecular weight condensation products. Reduced application rates are possible. The combination of faster cure and lower application rates has allowed such resins to be used as effective adhesives for plywood, for example, with veneer and interior plies having a higher moisture content than was previously possible.

Generally, resins according to the invention may contain from about 1% to about 15%, and preferably from about 1% to about 7% by weight, of potassium hydroxide, or more. Higher amounts of potassium hydroxide appear to provide little or no economic advantage, but from the standpoint of technology considerations, can be used.

Potassium modified phenolic resins can be made in accordance with the invention that demonstrate the ability to glue high moisture wood stock, for the production of oriented strandboard, for example, where the core moisture is as high as from 10% to 12% by weight, in all common commercial construction and at normal press cycle times.

Adhesive spreads are generally made in lower amounts than is true with conventional resins, and may be even lower where the wood stock used has a relatively high moisture content, such as, for example, overall moisture in the range from 5% to 9% by weight. Moreover press cycle times may be reduced by from about 30 seconds to 90 seconds, on normal moisture wood stock, that is, wood stock having a moisture content in the range from about 4% to about 8% but containing a substantial amount of stock having a moisture content below about 3% by weight. The use of the resin adhesives of the invention thus provide an opportunity for the production of wood products at lower costs.

DETAILED DESCRIPTION OF THE INVENTION

The present invention relates to the use of a potassium-hydroxide modified resole for the bonding of lignocellulosic materials such as in the manufacture of plywood or of composite panels such as hardboard, particleboard, fiberboard, oriented strandboard and the like. Phenol-formaldehyde resole resins are conventionally utilized in the manufacture of structural wood products, i.e., for the bonding of lignocellulosic materials. The phenol-formaldehyde resin may be unextended or extended. The number averagae molecular weight of the conventional phenol-formaldehyde resins which may be utilized in the present invention for the manufacture of composite panels, such as oriented strandboard, is preferably in the range from 700 to 2000, more preferably in the range from 1000 to about 1800. For plywood production, the number average molecular weight may be in the range from about 1,350 to 3,000, and preferably, from about 1,500 to 2,500. The ratio of formaldehyde to phenol is preferably 1.5:1 to 3.0:1, more preferably 1.5:1 to 2.0:1.

The resin solution has an alkalinity content, i.e., contains a base, in the range of 1% to about 15%, preferably 2% to 8%, based on the weight of the resin solution, when the base is calculated as sodium hydroxide. When the base is potassium hydroxide, the alkalinity content would generally be about 1.00% to about 10.71%. As used herein, alkalinity content meanas percent of solution according to equivalent sodium hydroxide weight unless expressly stated according to a different base. For example, an alkalinity content of 6.4% KOH would be equivalent to an alkalinity content of about 9%, based on the equivalent weight of sodium hydroxide. Additional base can be added to a commercial resin to bring it to the desired concentration.

This invention is thus concerned with potassium hydroxide modified phenolic resins and wood products produced by using these modified phenolic resins as adhesive binders. A phenolic resin is a condensation product of a phenol with an aldehyde, usually formaldehyde.

The phenolic resins with which the invention is concerned are thermosetting condensation products called resoles. These resins are produced using at least equimolar amounts of phenol and aldehyde, and generally, more of the aldehyde. A common ratio is one mole of phenol to one to three moles, preferably two moles of an aldehyde. Basic catalysts are ordinarily used in making resoles. The resoles useful in this invention, when ready for use, generally will contain both sodium hydroxide and potassium hydroxide. As used in the art, the term "resole" refers to phenolic resins that contain useful reactivity, as opposed to cured resins.

In preparing resins in accordance with the invention, formaldehyde is reacted with a phenol in an aqueous medium and in the presence of a basic catalyst. In a preferred embodiment of the invention, the basic catalyst present may be sodium hydroxide, potassium hydroxide, or a mixture of these. After a brief initial exothermic reaction, the reaction medium may be diluted somewhat with the addition of more hydroxide, for a further exothermic reaction. Since initially only a part of the total amount of formaldehyde to be reacted is employed, at this point the balance of the formaldehyde is preferably added gradually, with careful temperature control since the reaction is highly exothermic. At the conclusion of a suitable period of time to permit substantial completion of the reaction at this stage, water and a small additional amount of sodium hydroxide, potassium hydroxide, or a mixture of both, may be added. Any further amount of potassium hydroxide is added slowly, since the addition of the potassium hydroxide can be expected to generate an exothermic reaction. When the reaction has been completed, the reaction mixture is cooled and is generally ready for use. It has been found that the resin can be prepared by adding KOH to the reacting mixture at any time during the polymerization reaction. However, the addition of KOH to a fully polymerized resin does not result in a useful resin.

The phenol component may be phenol itself and substituted phenols such as cresol, and the like, as well as mixtures thereof. Highly functional phenols such as, for example, resorcinol, bisphenol-A, and the like, may also be used but are not preferred. Similarly, para-substituted phenols such as p-cresol, p-chlorophenol, and the like, can also be used, but preferably only a small part of the phenol component is composed of such substituted phenols.

The aldehyde component is preferably formaldehyde. It is most conveniently and economically employed in the form of the aqueous solution known as "formalin", which generally contains from 37% to 50% by weight of formaldehyde. However, other forms of formaldehyde such as paraform and trioxane can also be used. Other aldehydes such as acetaldehyde, propionaldehyde, and the like, and mixtures thereof, can also be used in place of formaldehyde or in partial substitution for it, but generally, formaldehyde in one of its commercially available forms is used.

The resole solution preferably has a solids content of at least about 40% by weight based upon the weight of the solution. It is particularly preferred that the resole resin solutions to be used in the porduction of oriented strand board have a solids content between about 50 and 60 percent by weight and the resole resin solutions to be used for the production of plywood have a solids content between about 40 and 48 percent by weight.

Bondable wood that is useful in making wood products may be in the form of wood strips, veneer, meal, sawdust, and flour, as well as leached or chemically treated solid wood having substantially unimpaired wood cellulose structural characteristics. More specifically, the potassium-modified resins are regarded as most useful in connection with the production of oriented strandboard and plywood. However, the resins are also useful for the production of particleboard and other wood products.

To produce the potassium-modified resole resins, no particular step appear to be critical at this time. Generally, good results are obtained when the final resole product contains from about 1% by weight of potassium hydroxide up to about 7% by weight of potassium hydroxide. More generally, however, the potassium-modified resoles can be prepared with either partial or total substitution of potassium hydroxide for the sodium hydroxide that is ordinarily used. The resulting resin generally will demonstrate a faster cure rate and will permit attaining desired results at a lower level of resin application than is the case with the sodium hydroxide resin. In the past, there has been no economic incentive to investigate the use of potassium hydroxide, since sodium hydroxide was believed to give good results and was less expensive.

The process of making the potassium-modified resoles requires little or no modification in present processes or equipment. In the extreme case where only potassium hydroxide is used, it can be substituted directly in the present process for the sodium hydroxide that would otherwise be used, with changes only to accommodate any differences in exothermic heat generated. When partial replacement of sodium hydroxide (NaOH) with potassium hydroxide (KOH) is used, then some minor modifications must be made to accommodate the use of two hydroxides rather than just one.

In general at least 1% of KOH (1% based on as is resole weight) is needed to produce a desired observable improvement in cure rate and lower rate of application. With amounts of KOH less than 1%, little or no improvement is observed. With amounts above about 10% KOH, a plateau effect is observed, i.e., any improvement inperformance is not in proportion to the cost of the added KOH. However, complete substitution of KOH for NaOH is feasible. No such improvements are observed with $Ca(OH)_2$ or $NH_4OH$ substitutions for NaOH.

The KOH-modified resole resin can be applied to the wood with any form of conventional equipment currently in use. Such equipment includes spray nozzles, atomizing wheels, roll coaters, curtain coaters, and foam applicators. The application of the resin to the lignocellulosic material is performed immediately or fairly shortly before hot pressing.

For example, when producing a composition panel such as particleboard by the mat process, wood flakes, fibers or particles are sprayed with a solution of a resin. The sprayed pieces of wood may be passed througha forming head to make a mat. Alternatively, multiple forming heads may be employed. For example, three forming heads may be used to produce three separate mats that can be juxtaposed for the production of a three-ply board, the two outer heads being used to put down a fine surface material, and the inner head being used to put down a coarser material for the center layer of the board.

The choice of raw material for the lignocellulosic component is based mainly on availability and cost. As is common in board-making manufacturing operations, the wood from which particles are produced may be in the form of logs that are unsuitable for converstion into lumber or plywood because they are too small, too crooked or too knottly, or the like. When such logs are reduced to small particle form, defects are screened out.

The invention is useful in the production of board that is made from homogeneous lignocellulose material or from mixtures of different kinds of such material. A board may be made, for example, completely from wood particles, or completely from wood flakes, or from fibers, planer shavings or the like, or from mixtures of these. Similarly, a board may be formed with multiple layers, with fine surface flakes and a core of coarse flakes, or it may have a coarse-flaked core with an overlay of fibers on each of its surfaces. Other combinations may also be produced.

Wood flakes are generally made by a machine that shaves off flakes of the wood in a direction such that the length of each flake is parallel to the wood grain. A normal size flake has dimensions such as ¼" by 1", with a thickness in the range from about 0.005" to about 0.075", depending upon the intended end use.

The cellulosic material may also be in the form of wood fibers. In the production of such fibers, wood chips are generally mechanically reduced to fiber form in an attrition mill. The fibers so produced are generally placed in the form of a pulp or water slurry containing from about 1% by weight to 2% by weight of fiber. While chemical binders may sometimes be omitted in the production of composition panels from fibers, when a resin binder of the phenol-formaldeyde type is employed, the present invention is useful.

The wood pieces employed in making the composite panel have some affinity for water and a tendency to absorb it. Water entering a composite panel tends to weaken it, may cause some swelling of surface fibers, and increases the dimensional instability of the composition panel. To prevent this tendency to absorb water, a wax may be applied to the wood pieces to provide a built-in resistance in the composition panel to water absorption. The wax employed may be any wax that will suffice, for example, a crude scale wax or a microcrystalline wax. It is applied, generally, at a rate of from about 10% by weight to about 30% by weight of the binder, and preferably about 20% by weight, dry solids basis. When expressed in terms of oven-dried furnish solids, the amount of wax is from about 0.3% by weight to about 3.0% by weight of wax to wood.

The amount of phenol-formaldehyde resin used generally will depend upon the characteristics required in the final product. For a high-grade insulation board, the amount of binder used may be up to about 5% or resin solids based on dry finished board weight, and generally may be from about 2% to about 4%. For a good grade of particleboard, the amount of resin should be sufficient to provide from about 3% to about 8% dry resin solids based on the weight of the furnish for the composite panel. In a multi-layered board, a lesser amount of resin will often be used in the core than is used for the surface layers, such as, for example, 3% of resin solids for the core, and 8% of resin solids in the two surface layers. The added amount of resin in the surface layers imparts added strength and hardness as compared to the core. More resin than 8% can be used, but a greater amount presently is not cost-efficient.

Hot pressing conditions will depend upon the thickness of the composite board as well as on resin characteristics. A representative press cycle for the production of a ¾" thick phenolic bonded particleboard would be about 7-10 minutes at a press platen temperature of about 380°-420° F. The pressing time can be reduced by the present invention without loss in board quality. The invention is also useful in the manufacture of plywood.

The plywood process requires straight logs cut to length, and conditioned in heated vats containing water and surfactants to increase the heating efficiency of the vats. The heated logs are then "peeled" wherein a veneer of predetermined thickness is removed continuously until the log diameter is reduced to a certain point, usually 5-8 inches. The veneer is then clipped into strips, sorted and dried to a moisture content of 15% or less.

After drying, the veneers are graded and assembled into plywood panels. The adhesive is applied to the veneers at this stage of manufacture. The adhesive is usually composed of phenol-formaldehyde resin, water, a basic material such as sodium hydroxide, and fillers that include inorganic and organic flours, such as wheat flours, wood flours, and clays. The adhesives are specially formulated for individual user mills depending on manufacturing equipment, type of wood to be glued, type of product to be made, and ambient environment conditions at the time of panel manufacture. The adhesive is usually applied to the veneers by roll coater, curtain coater, sprayline or foam extruder. The adhesive as applied often contains phenol-formaldehyde resin at a level of 20%-40% resin solids by weight. The adhesive is normally used with spread levels of 50 lbs.-110 lbs. of adhesive per 1000 square feet of gluelines, when the veneer is spread on both sides, or 25 lbs.-55 lbs., when spread on one side.

After the adhesive is applied to the wood veneers and the panels are assembled, they are consolidated under heat and pressure. This is usually done in a steam hot-press using platen temperatures of 240°-350° F. and pressures of 75-250 psi.

In producing plywood, the most critical glueline is the innermost one. This glueline is the most difficult to cure under present conditions. That is, often the innermost glueline is not fully cured when the other gluelines are. It is necessary, then, to apply additional hot pressing to the board to cure this glueline.

It has been discovered that several advantages are obtained by utilizing a KOH-modified resole resin, in the manufacture of structural wood products, i.e., plywood and composite board. One advantage is that cure time can be decreased. For example, in the preparation of ¾" oriented strandboard a 540 sec. cycle (press and heat) is utilized when the resin is an unmodified resole resin. The time can be reduced to a 10% shorter cycle with a KOH-modified resin, without loss in durability, bond strength, and other important properties. A second, significant advantage is that the use of the KOH-modified resin increases the tolerance to moisture in the plies or furnish. Thus, the wood could have a 3% higher moisture content before blending than in a conventional system. Further, the KOH-modified resin is not only faster curing, without detrimental side effects, but there is no loss of flowability. The KOH-modified resoles behave as if they were lower molecular weight condensation products, permitting reduced spreads (i.e. application rates).

Even when a high moisture content furnish is used, no blows result, and board properties such as thickness, swell and durability are good. After pressing and heating, i.e., curing the resin, the moisture content of the product is also generally higher. It is not uncommon to obtain a 2.7% to 3.0% moisture content in a ¾" strandboard. This advantage is also significant, since the strandboaard will not pick up as much moisture later, caausing fewer buckling problems. Since the system can withstand more moisture, it is possible to produce more premium-grade panels. It has been found that the thicker the board, the more effective the KOH-modified resole binder, and the more significant the advantages.

The invention will now be illustrated in greater detail by reference to specific demonstrations of the invention in the examples that follow. In these examples, as elsewhere in the specification, all references to parts and percentages refer to parts and percentages by weight and all temperature reference refer to degrees Celsius, unless expressly stated to be otherwise.

EXAMPLE 1

Production of a Potassium-Modified Resole In Which About ½ of the Sodium hydroxide is replaced with potassium-hydroxide on a molar basis.

The production of resole resins involves the generation of substantial amounts of heat because of the exothermic nature of the reaction. Consequently, in this example, the reaction is caused to occur in such a manner as to keep the reaction under control. Accordingly, except for the phenol, the remaining ingredients are added in stages, and appear in the following list by item number for each ingredient and with both % amounts, "as is" weight amounts, and dry basis weight amounts, reported.

TABLE 1

| | Resin Components | | | |
|---|---|---|---|---|
| Item | "As Is", % by weight | "As Is" Weight, g. | % by Weight Dry Basis | % Water |
| 1. Phenol, 100% | 33.144 | 1325.8 | 33.144 | — |
| 2. $CH_2O$, 50% | 12.438 | 497.5 | 6.219 | 6.219 |
| 3. Water | 6.706 | 268.2 | — | 6.706 |
| 4. KOH, 85% | 1.052 | 42.1 | 0.894 | 0.158 |
| 5. NAOH, 50% | 1.500 | 60.0 | 0.750 | 0.750 |
| 6. $CH_2O$, 50% | 32.525 | 1301.0 | 16.2625 | 16.2625 |
| 7. Water | 6.068 | 242.7 | — | 6.068 |
| 8. KOH, 85% | 2.707 | 108.3 | 2.301 | .406 |
| 9. NaOH, 50% | 3.860 | 154.4 | 1.930 | 1.930 |
| | 100.000 | 4000.0 g | 61.500% | 38.500% |

Items 1, 2 and 3 were placed in a reactor and a mild exothermic reaction immediately ensued, raising the temperature of the reaction mixture to about 36° C. Item 4 was then added, with some agitation of the contents of the reactor to insure through mixing. An exothermic reaction occurred, raising the temperature to about 45° C.

Item 5 was then added, about an hour and 40 minutes after the initial items were placed in the reactor. A further exothermic reaction occurred, raising the temperature to about 53° C. About ten minutes later, the temperature had risen to 66° C., and item 6 was added in small increments, to permit control over the reaction. About 15 minutes later, one half of the formaldehyde in item 6 had been added and the temperature had increased to about 75° C. Ten minutes later, all of the item 6 formaldehyde had been added, and the temperature had risen to 91° C. At this point, the temperature was held at about 91° C. by the application of cooling water to a jacket above the reactor. Twenty-five minutes later, the temperature haad risen to about 98° C., but after another ten minutes it had dropped with the cooling to about 96° C. Five minutes later, items 7 and 9 were added to the reactor with stirring. No exothermic reaction was observed at this time. Item 8 was then added to the reactor very slowly, and at the completion of the addition a few minutes later, the temperature remained at 96° C. Cooling wasa continued and the temperature dropped over a period of about fifteen minutes to below 80° C.

The viscosity of the resole was 510 cps as measured on a Brookfield viscometer model RVF using spindle no. 2, at 20 rpm, and at 25° C. The resole contained 52.53% solids. Specific gravity was 1.2229, 25/25.

COMMENTS ON THE FOLLOWING EXAMPLES

In the following examples, wood products were made using the potassium-modified resole resin of Example 1 or similarly prepared potassium-modified resole resins. These products were then compared to products in which the potassium-modified resole resin was replaced by a control resin. The control resins were made in the same way and using the same components as the potassium-modified resin except that only one base, sodium hydroxide, was used to make the control resin. The total number of moles of base used to make the control was the same as the total number of moles of base used to make the potassium-modified resole resin.

In Examples 2 and 3, strandboard was made under laboratory conditions from untreated furnish and OSB (oriented strandboard) resin formulations. Untreated furnish was put in a drum blender and sprayed with the resin formulation. The mat was then pressed using a platen temperature of 400° F. for a measure length of time. The non-oriented strandboard panel so formed had a target thickness of 7/16".

In order to test each strandboard panel, it was cut into 2" by 2" blocks. Ten blocks from each panel were measured for weight and thickness. Each of the ten blocks was then tested to determine its bond strength. In this test each of the 2" by 2" faces of the block was glued to one of two metal plates. A measured and increasing force was then applied to urge the metal plates apart, until the block failed.

In Example 2, the potassium-modified resin of Example 1 was compared to the control resin. The formulations of the resin described in Example 1 and of the control resin did not include urea. Typically urea is included in the formulation of OSB resins to improve the flow of the resin. In Example 3, urea was added to the formulation of the potassium-modified resin of Example 1 and the resulting formulation was compared to the potassium-modified resin of Example 1.

EXAMPLE 2

Strandboard Made With The Potassium-Modified Resin of Example 1 Compared With Strandboard Made With The Control Resin of Example 1

In this example, the furnish used was hardwood face material from Louisiana with a moisture content of five percent. The resin was sprayed on the furnish in an amount equal to 4.0% of the total weight of the furnish and the resin.

Four strandboard panels were made and tested. In Table 2 a summary of the results is presented. Ten samples were used to compute average panel thickness, average panel density, and average internal bond, unless otherwise noted below.

TABLE 2

| Resin | Test 1 Potassium-Modified Resin w/o urea | Test 2 Potassium-Modified Resin w/o urea | Test 3 Control Resin w/o urea | Test 4 Control Resin w/o urea |
|---|---|---|---|---|
| Press Cycle | 150 | 180 | 150 | 180 |

TABLE 2-continued

| Resin | Test 1 Potassium-Modified Resin w/o urea | Test 2 Potassium-Modified Resin w/o urea | Test 3 Control Resin w/o urea | Test 4 Control Resin w/o urea |
|---|---|---|---|---|
| (secs.) | | | | |
| Mat Moisture | 7.2% | 7.2% | 7.4% | 7.6% |
| Panel Thickness (inches) | .439" | .419" | .449" | .432" |
| Panel Density #/ft$^3$ | 43.6 | 46.6 | 41.4 | 42.6 |
| Internal Bond (psi) | 25 | 94 | 10 | 76 |

In test 1, the test results of nine samples were used to calculate the averages. One sample was not used because of fold-failure. A fold-failure comes about when a large flake of wood in the furnish folds over on itself so that the inner surfaces are not covered by resin. When the block is pulled apart to determine the strength of the internal bond, there is a break at the fold that does not reflect a failure of the resin bond because there is no resin in this area. For this reason, the results of fold-failure samples are not used.

In Test 2, test results of six samples were used. In the case of two samples there were fold failures. In the case of the third sample there was a hot melt failure, i.e. the bond between the sample and one of the metal plates to which it was glued failed. In the case of the fourth sample, it appears that the sample was judged defective early in the testing.

In Test 3, the test results of ten samples were used.

In test 4, the test results of nine samples were used. One sample was not used because of fold-failure.

Several conclusions can be made by studying the data shown in Table 2. When the results of Test 1 and Test 3 are compared, it is noted that the press cycle was 150 seconds in both tests; the internal bond of the potassium-modified resin board was 25 psi and that of the control board was 10 p.s.i.; the bond of the potassium-modified resin board was greater by a faactor of 2.5. When the results of Test 2 and Test 4 are compared, it is noted that the press cycle was 180 seconds in both tests; the internal bond of the potassium-modified bond was 94 psi; and the internal bond of the control board was 76 psi. The bond of the potassium-modified resin board was greater by a factor of 1.24.

Therefore the potassium-modified resin outperformed the control at both the high press cycle and the low press cycle. The potassium-modified resin outperformed the control to a greater extent at reduced press cycles.

EXAMPLE 3

Strandboard Made With A Formulation of Potassium-Modified Resin Without Urea Compared To Strandboard Made With A Formulation of Potassium-Modified Resin With Urea In this example, the furnish used was hardwood face material from Louisiana with a moisture content of 4.2%. The resin was sprayed on the furnish in an amount equal to 4.0% of the total weight of the furnish and the resin. Four strandboard panels were made and tested. A summary of the results is presented in Table 3. Ten samples were used to determine average panel thickness, average panel density and average internal bond unless otherwise stated below.

The potassium-modified resin of Example 3 was modified with urea in the following way. In the process for making the potassium-modified resin, at the point when all the hydroxides had been added and the mixture had been cooled, the urea was added. About 10% by weight of urea was added based on the total weight of the ingredients.

TABLE 3

| Resin Urea | Test 1 Potassium-Modified Resin w/o urea | Test 2 Potassium-Modified Resin w/o urea | Test 3 Potassium-Modified Resin plus urea | Test 4 Potassium-Modified Resin plus urea |
|---|---|---|---|---|
| Press Cycle (secs.) | 150 | 180 | 150 | 180 |
| Mat Moisture | 6.8% | 6.8% | 6.2% | 6.2% |
| Panel Thickness | .462" | .442" | .443" | .438" |
| Panel Density | 43.5 | 43.7 | 42.6 | 43.9 |
| Internal Bond (psi) | 15 | 69 | 16 | 67 |

In Test 1, test results of nine samples were used. One sample was not used because of fold failure.

In Test 2, test results of 7 samples were used. Three samples were not used because of fold failure.

In Test 3, test results of 8 samples were used. Two samples were not used because of fold failure.

In Test 4, test results of 6 samples were used. Four samples were not used because of fold failure.

Several conclusions can be mace by studying Table 3. When the press time was 150 seconds as in Test 1 the Test 3, the potassium-modified resin board without urea in the resin and the potassium-modified resin board with urea in the resin had about the same internal bond strength: 15 psi and 16 psi respectively. When the press time was 180 seconds as shown in Test 2 and Test 4, the two boards again had about the same internal bond strength: 69 psi and 67 psi respectively. These test results indicate no improvement in the internal bond with the addition of urea.

Comments on Examples 4, 5 and 6

In Example 4, Example 5, and Example 6, plywood was made under laboratory conditions using ⅛ inch southern pine veneer and a standard adhesive binder formulation using different resins. The adhesive formulation was as follows:

Adhesive Binder Formulation:

| % Resin Solids | 28.8 |
|---|---|
| % Filler (Cocob ™) | 6.5 |
| % Extender (Wheat Flour) | 5.5 |
| % Sodium Hydroxide | 1.5 |
| % Water | 58.0 |

A control adhesive binder was made up according to this formulation where, the resinous component was a standard commercial plywood resin currently marketed by Borden, Inc. This resin is similar to the resin described in Example 1, and made in essentially the same way, but with NaOH and no KOH.

In the tests reported in these examples, plywood was made with the control adhesive binder, and also with an adhesive binder made up according to the above formulation but with a potassium-modified resole resin in which a molar equivalent amount of potassium hydroxide was used to replace some of the sodium hydroxide used in making up Borden's commercial plywood resin; such adhesives will be referred to as the potassium-modified adhesive formulations. If 50% of the sodium hydroxide has been replaced, the mix will be called 50% potassium modified adhesive formulation and so on.

The filler of the adhesive mix is Cocob TM filler which is a by-product from the production of furfural alcohol from corncobs.

The adhesive mix was made by mixing 199 parts of water, 113 parts Cocob TM filler, and 200 parts of the wheat flour extender, for three to five minutes; adding 200 parts of resin and mixing for three minutes; adding 45 parts of 50% NAOH and mixing for 15 minutes and adding 750 parts of solids resin and mixing for three minutes. The parts were by weight and the resin has 45% solids.

The plywood panels in these examples were made using 12 inch by 12 inch squares of ⅛" veneer. Adhesive mix was applied to the veneer in an amount equivalent to 80-85 pounds per one thousand square feet at glue line. After the adhesive was applied, the panel (either a 3 ply or 5 ply thickness) was pressed at a platen temperature of 400° F. and panel pressure of 200 psi. The panels were not hot stacked. In order to conduct tests on the panels, each panel was cut into 3½ inch by 1 inch samples, the standard testing size for plywood samples.

In order to test the plywood, the samples were subjected to the standard vacuum-pressure test, product standard PSI-84. When the plywood had sheared, the area of breakage was studied. If the entire shear area was on the veneer, this was 100% wood failure. If the entire area was in the adhesive bond, this was a 0% wood failure. Most breaks were measured to be between the 0% and 100% extremes. The purpose of these experiments was to determine how good the adhesive bonds were, the higher the percent of wood failure, the better the adhesive bond was.

EXAMPLE 4

Plywood Made With The Control Adhesive Mix Compared To Plywood Made With An Adhesive Formulation Made Up With a 50% Potassium-Modified Resin, With Variations In Assembly Time, Press Time and Veneer Moisture Content In this Example, plywood was made with an adhesive formulation made with a 50% potassium-modified resin, and then compared to the control plywood. Tests were made under varying times of assembly and pressing. Assembly time is the time that elapses from the time of application of adhesive to the veneer to the time the pressing cycle is begun.

The results of the tests are shown in Table 4.

TABLE 4

| Adhesive Formulation: | Tests 1–3 50% Potassium-Modified Resin in the Adhesive Formulation | | | Tests 4–6 Control Adhesive Formulation | | |
|---|---|---|---|---|---|---|
| Assembly Time | 20 Mins. | | | 20 Mins. | | |
| Panel Thickness | ⅜" 5-Ply | | | ⅜" 5-Ply | | |
| Veneer Moisture | 1.6% | | | 3.9% | | |
| Press Time (Mins.) | 4.5 | 5.0 | 5.5 | 4.5 | 5.0 | 5.5 |
| Ave. % Wood Failure | 81 | 79 | 100 | 56 | 01 | 34 |
| Test Number | 1 | 2 | 3 | 4 | 5 | 6 |
| Adhesive Formulation | Tests 7–10 50% Potassium-Modified Resin in the Adhesive Formulation | | | Tests 11–14 Control Adhesive Formulation | | |
| Press Time | 3 Mins. | | | 3 Mins. | | |

TABLE 4-continued

| Panel Thickness | 3/8" 3-Ply | | | | 3/8" 3-Ply | | | |
|---|---|---|---|---|---|---|---|---|
| Veneer Moisture | 1.6% | | | | 3.9% | | | |
| Assembly Time (Mins.) | 10 | 20 | 40 | 80 | 10 | 20 | 40 | 80 |
| Ave. % Wood Failure | 81 | 89 | 96 | 73 | 41 | 94 | 98 | 94 |
| Test Number | 7 | 8 | 9 | 10 | 11 | 12 | 13 | 14 |

In tests 1–6, one 5-ply panel was prepared for each test. Seven 3½ inch by 1 inch samples from each panel were subjected to vacuum-pressure testing. The average of the seven test results is reported in the table.

In tests 7–14, one 3-ply panel was prepared for each test. Ten 3½ inch by 1 inch samples from each panel were tested. The average of the ten test results is reported in the table.

The following conclusions can be drawn from the data in Table 4.

Under varying press time, other conditions being equal (except for the moisture content of the veneer), as in tests 1–6 the plywood panels made with the adhesive formulation containing the 50% potassium modified resin outperformed the panels made with the control formulation for each of the three press times. The most dramatic showing was at the 5 minute press time. The control panel had a 1% average wood failure, which indicates the shear break was almost entirely at the glue line. The 50% potassium modified resin panel had a 79% average wood failure, which indicates that over ½ of the failure was in the veneer.

In this exampmle the veneer made with the adhesive formulation made up with 50% potassium resin had only half the moisture content of the veneer used with the control, i.e. 1.6% as compared with 3.9%. In this connection, it should be noted that there was no evidence in these samples of a "dried-out-glueline" wherein the water of the adhesive mix was absorbed by the veneer until such time that insufficient moisture remained to aid the phenolic polymer in flowing out and wetting the mating substrate during the hot press cycle. This is significant since the 50% potassium board was made with a plywood with less water than the control. A plywood with reduced water content would be more apt to cause "dried-out glueline".

Under varying assembly times, other conditions being equal (except for moisture content) as in tests 7–14, it was shown that if the assembly time was kept down in the 10 minute range, the plywood panels made with the adhesive formulation made up with 50% potassium modified resin dramatically outperformed the control. This outperformance did not occur if the assembly time were lengthened to 40 and 80 minutes. Therefore, the adhesive formulation made up with 50% potassium modified resin is especially useful when assembly time is short.

EXAMPLE 5

Plywood Made With The Control Adhesive Mix Compared To Plywood Made With An Adhesive Formulation Made Up With a 50% Potassium-Modified Resing Using Veneers With The Same Moisture Content And Varying Press Time In this example, plywood was made with an adhesive formulation made up with 50% potassium-modified resin and was compared with the control. The veneers used to make each type of plywood had about the same moisture content. Varying press times were used, other things being about equal. The results of the testing are shown in Table 5.

TABLE 5

| Adhesive Formulation | Tests 1–3 50% Potassium-Modified | | | Tests 4–6 Control | | |
|---|---|---|---|---|---|---|
| Assembly Time | 20 Minutes | | | 20 Minutes | | |
| Panel Thickness | ⅜" 5-Ply | | | ⅜" 5-Ply | | |
| Veneer Moisture | 2.6% | | | 2.7% | | |
| Press Time (Mins.) | 4.5 | 5.0 | 5.5 | 4.5 | 5.0 | 5.5 |
| Ave. % Wood Failure | 53 | 92 | 95 | 19 | 46 | 85 |
| Test Number | 1 | 2 | 3 | 4 | 5 | 6 |

For each test, one 5-ply panel was prepared. Ten 3½ inch by 1 inch samples from each panel were subjected to vacuum-pressure testing. The average of the ten tests is reported in the table.

The following conclusions can be drawn from the data in Table 5. When the moisture content of the veneer is about the same for all the boards and only the press time is varied, the board made the adhesive formulation made up with the 50% potassium modified resin performed better than the control at every press time tested. However, the outperformance was most dramatic at 4.5 minutes press time by a factor of more than 2. At 5 minute press time the outperformance was by a factor of a little less than 2. At higher press times the advantage of using the adhesive formulation made up with 50% potassium modified resin fell off.

EXAMPLE 6

Plywood Made With The Control Adhesive Mix Compared To Plywood Made With Adhesive Formulations Made Up With Potassium Modified Resin In Which The Percent of Potassium In The Resin Is Varied In this example plywood samples are made with adhesive formulations made up with 25% potassium modified resin; 50% potassium modified resin and 75% potassium modified resin.

The results of the testing are shown in Table 6.

TABLE 6

| Adhesive Formulation | Tests 1–3 Control 0% Potassium-Modified | | | Tests 4–6 50% Potassium-Modified | | |
|---|---|---|---|---|---|---|
| Assembly Time | 20 Minutes | | | 20 Minutes | | |
| Panel Thickness | ⅜" 5-Ply | | | ⅜" 5-Ply | | |
| Veneer Moisture | 1.5% | | | 1.5% | | |
| Press Time (Mins.) | 4.5 | 5.0 | 5.5 | 4.5 | 5.0 | 5.5 |
| Ave. % Wood Failure | 43 | 91 | 86 | 71 | 83 | 92 |
| Test Number | 1 | 2 | 3 | 4 | 5 | 6 |

| Adhesive Formulation | Tests 7–9 75% Potassium-Modified | | | Tests 10–12 25% Potassium-Modified | | |
|---|---|---|---|---|---|---|
| Assembly Time | 20 Minutes | | | 20 Minutes | | |
| Panel Thickness | ⅜" 5-Ply | | | ⅜" 5-Ply | | |
| Veneer Moisture | 1.5% | | | 1.6% | | |
| Press Time (Mins.) | 4.5 | 5.0 | 5.5 | 4.5 | 5.0 | 5.5 |
| Ave. % Wood Failure | 84 | 88 | 84 | 76 | 87 | 97 |
| Test Number | 7 | 8 | 9 | 10 | 11 | 12 |

For each test, one 5-ply panel was prepared. Ten 3½ inch by 1 inch samples from each panel were subjected to vacuum pressure testing. The average of the ten tests is reported in the table.

The following conclusions can be drawn from Table 6. When the press time was 4.5 minutes, panel made the adhesive formulation made up with potassium modified resin dramatically outperformed the control regardless of whether 25%, 50% or 75% potassium hydroxide was used. The advantage of using the potassium modification disappeared at higher press times.

One important conclusion to be drawn from all of these tests is that comparable and in many cases superior strandboard and plywood can be made using adhesives made from potassium modified resole resin when compared to adhesives made from the unmodified resin. These comparable and in many cases superior products must be made using a shorter press time in order to maximize the advantage. But shorter press times are advantageous. Less power is needed to press the product. A shorter press time allows for a higher production rate since a given press can produce more units or square feet of board in a given time. In short the use of this potassium-modification is very desirable for economic reasons.

GENERAL

Among the important advantages of the invention are achievement of good bonding and good strength with the use of a smaller amount of the resole itself. Other advantages include generally faster cycle times, so that a given press can produce more units or square feet of board in a given amount of time. In addition, the adhesive binders made using the resoles of this invention have greater tolerance to the presence of moisture in the wood that is being bonded.

While the resins of the invention need no curing agent, it is possible if one wishes to use curing agents with these resins. Preferred curing agents may be selected from the group consisting of lactones, organic carbonates, esters, or mixtures of these. One preferred lactone curing agent is gamma-butyrolactone; propylene carbonate is an example of a suitable organic carbonate. Suitable esters include very low molecular weight esters such as, for example, methol formate, and higher molecular weight materials such triacetin (glycerol triacetate). Other types of curing agents may also be used and are known in the art. Generally, however, the lactones, organic carbonates, esters, and mixtures of them are preferred, and other examples of such curing agents are described in the copending Detlefson, et al. patent application that has already been incorporated in this application by reference.

If a curing agent is used, it may be separately sprayed on the surface of the wood component, either before or after the adhesive is applied. Alternatively, as disclosed in the Detlefson application, the curing agent may be mixed with the adhesive binder sufficiently far upstream of the applicator head to permit resonably thorough mixing prior to application to the wood.

CONCLUSION

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A process for the production of plywood by bonding together with an adhesive binder that is curable under heat and pressure, at least two plis having a layer of the adhesive binder between them, comprising
   applying to at least one surface of at least one ply an adhesive binder that is curable upon the application of heat, and that comprises an alkaline phenolic resole resin solution having a solids content of at leat about 40% by weight and an alkalinity content calculated as sodium hydroxide between about 2 and 8 percent by weight of said solution, wherein said alkaline resole solution comprises between 1 and about 7 percent by weight of potassium hydroxide,
   juxtaposing the ply to which the adhesive binder has been applied with another ply, and then
   subjecting said juxtaposed plies to heat and pressure to cure the resin and unite the plies to form plywood.

2. The process of claim 1 wherein the amount of potassium hydroxide in said alkaline resole solution is in the range from about 3% to about 7% by weight based on the weight of said solution, the number average molecular weight of said resole resin is in the range from about 1350 to about 3000, and the solids content of said resole resin solution is in the range from about 40% to about 48% by weight.

3. The process of claim 2 wherein the amount of resole resin solution applied to said ply is from an effective amount just sufficient to cause adhesion of the plies up to an amount of about 55 lbs. per 1000 square feet of the surface of said ply.

4. The process of claim 3 wherein the number average molecular weight of said resin is in the range from about 1500 to about 2500.

5. A process for the production of oriented strandboard by bonding oriented wood strands under heat and pressure using an adhesive binder, comprising
   spraying wood strands with an adhesive binder therefor that is curable upon the application of heat and that comprises an alkaline phenolic resole resin solution having a solids content of at least about 40% by weight and an alkalinity content calculated as sodium hydroxide of between about 2 and 8 percent by weight of said solution, wherein said alkaline resole solution comprises between 1 and about 7 percent by weight of potassium hydroxide,
   forming the sprayed strands into an oriented mat, and then
   subjecting said mat to heat and pressure to cure said resin and to unite said oriented strands to form board.

6. The process of claim 5 wherein the amount of potassium hydroxide in said alkaline resole solution is in the range from about 3% to about 7% by weight based on the weight of said solution, the number average molecular weight of said resole resin is in the range from about 700 to about 2000, and the solids content of said resole resin solution is in the range from about 50% to about 60% by weight.

7. The process of claim 6 wherein the amount of resole resin solution applied to the strands is in the range from about 4% to about 5.5% by weight of said resin solution based on the weight of the strands.

8. The process of claim 7 wherein the number average molecular weight of said resin is in the range from about 1000 to about 1800.

9. A cellulosic board formed under heat and pressure from separate cellulosic components bound together by an adhesive binder cured under applied heat and pressure, wherein said binder in its uncured form comprises an alkaline phenolic resole resin in aqueous solution having a solids content of at least about 40 percent by weight and an alkalinity content calculated as sodium hydroxide of between about 2 and 8 percent by weight of said resole solution, wherein said alkali resole solution compriese between 1 and about 7 percent by weight of potassium hydroxide.

10. The cellulosic board of claim 9 wherein the weight average molecular weight of said phenolic resole resin is at least 700 and the amount of potassium hydroxide in said resole resin solution is in the range from about 3% to about 7% by weight.

11. The cellulosic board of claim 10 in the form of oriented strand board and wherein the number average molecular weight of said phenolic resole resin, prior to curing, is in the range from about 1350 to about 3000.

12. The cellulosic board of claim 10 in the form of plywood wherein the number average molecular weight of said resole resin prior to curing is in the range from 1500 to 2500.

13. A process for the production of cellulosic board materials by bonding cellulosic components under heat and pressure, comprising
   applying to separate cellulosic components as a binder therefor an alkaline phenolic resole resin solution having a solids content of at least about 40% by weight and an alkalinity content calculated as sodium hydroxide of between about 2 and 8 percent by weight of said resole solution, wherein said alkaline resole solution comprises between 1 and about 7 percent by weight of potassium hydroxide, and then
   subjecting said cellulosic components to heat and pressure to cure said resin and to unite said components in board form.

14. The process of claim 1 for the production of strandboard wherein said cellulosic components are strands and said resole resin solution is applied to said strands by spraying at a solids content in the range from about 50% to about 60% by weight.

15. The process of claim 13 for the production of plywood wherein said cellulosic components are separate plies and said resole resin solution is applied at a solids content of from about 40% to about 48% by weight.

16. The process of claim 13 wherein the number average molecular weight of said phenolic resole resin is at least 700.

17. The process of claim 14 wherein the number average molecular weight of said phenolic resole resin is in the range from about 1000 to about 1800.

18. The process of claim 15 wherein the number average molecular weight of said resin is in the range from about 1350 to about 3000.

19. The process of claim 14 wherein said strands, prior to the application of adhesive, have a moisture content in the range from about 1% to about 7% by weight.

20. The process of claim 19 wherein the moisture content of said strands is in the range from about 3% to about 5% by weight.

21. The process of claim 19 for the production of oriented strandboard wherein the amount of resin applied to said strands is in the range from about 4% to about 5.5% by weight of said resin solution based on the weight of said strands.

22. The process of claim 21 wherein the amount of resin applied is not above 5% by weight based on the weight of said strands.

23. The process of claim 15 for the production of plywood wherein the moisture content of the individual plies, prior to application of the resin solution, is in the range from about 0% to about 17% by weight of moisture.

24. The process of claim 23 for the production of plywood wherein the moisture content of the individual plies, prior to application of the resin solution, is in the range from about 8% to about 12% by weight of moisture based on the weight of the plies.

25. The process of claim 23 wherein the amount of resin solution applied to the ply surfaces to be adhered is in the range from 30 lbs. to 50 lbs. per 1000 square feet per single glue line.

26. The process of claim 24 wherein the rate of application of said resin solution to the surface of each ply that is to be adhered to another ply is an amount in the range from about 35 lbs. to about 45 lbs. per 1000 square feet per single glue line.

27. The process of claim 15 for the production of plywood wherein the moisture content of the individual plies, prior to application of the resin solution, is in the range from about 0% to about 28% by weight.

28. The process of claim 15 for the production of plywood wherein the moisture content of the individual plies, prior to application of the resin solution, is in the range from about 0% to about 20% by weight.

29. A composition for the production of cellulosic board comprising
   (a) separate cellulosic components, and
   (b) an effective amount to serve as a binder for said components of an aqueous solution of a potassium alkali phenolic resole resin applied to said components as an adhesive binder, said aqueous resole solution having a solids content of at least about 40% by weight and an alkalinity content calculated as sodium hydroxide of between about 2 and 8 percent by weight of said resole solution, wherein said alkaline resole solution comprises between 1 and about 7 percent by weight of potassium hydroxide,
   said components after said resole solution is applied thereto being capable of being consolidated to board form under sufficient heat and pressure to effect curing of said resole resin.

30. The composition of claim 29 wherein the amount of potassium hydroxide in said resole resin solution is in the range from about 3% to about 7% by weight based on the weight of said solution.

31. The composition of claim 30 wherein the number average molecular weight of said resole resin is at least 700.

32. The composition of claim 31 wherein the number average molecular weight of said resole resin is at least 1000 but not in excess of about 2200.

33. The composition of claim 32 wherein the solids content of said resole resin solution is at least about 40% by weight based on the weight of said solution.

34. A composition for the production of strandboard comprising
   (a) separate strands of wood suitable for the production of strandboard, said wood strands having an average moisture content in the range from about 1% to about 7% by weight, and
   (b) from about 4% to about 5.5% by weight based on the weight of said wood strands of an aqueous solution of an alkaline phenolic resole resin applied to said wood strands as an adhesive binder, said resole solution having a solids content of at least about 40 percent by weight and an alkalinity content calculated as sodium hydroxide of between about 2 and 8 percent by weight of said resole solution, wherein said alkaline resole solution comprises between 1 and about 7 percent by weight of potassium hydroxide, and wherein the number average molecular weight of said resin is in the range from 700 to 2000,
   said wood strands after said resole solution is applied thereto being capable of being consolidated to board form under sufficient heat and pressure to effect curing of said resole.

35. The composition of claim 34 wherein the amount of potassium hydroxide in said alkaline resole solution is in the range from about 3% to about 7% by weight based on the weight of said solution, and the number average molecular weight of said resole resin is in the range from 1000 to 1800.

36. The composition of claim 35 wherein the solids content of said resole resin solution is in the range from about 50% to about 60% by weight.

37. A composition for the production of plywood comprising
   (a) separate wood plies suitable for plywood production, having an average moisture content in the range from 0% to 17% by weight, and
   (b) from about 25 lbs. to about 55 lbs. of an adhesive binder comprising an aqueous solution of a alkaline phenolic resole resin applied to a surface of each of said plies that is to be adhered to another ply, per 1000 square feet surface of said ply in a single glue line, said aqueous resole solution having a solids content of at least about 40 percent by weight and an alkalinity content calculated as sodium hydroxide of between about 2 and 8 percent by weight of said resole solution, wherein said alkaline resole solution comprises between 1 and about 7 percent by weight of potassium hydroxide,
   said plies after said adhesive binder is applied thereto being capable of being consolidated together to form plywood when juxtaposed and placed under sufficient heat and pressure to effect curring of said resole.

38. The composition of claim 37 wherein the amount of potassium hydroxide in said aqueous resole solution is in the range from 3% to 7% by weight of said solution, and wherein the number average molecular weight of said resole resin is in the range from about 1350 to about 3000.

39. The composition of claim 38 wherein the solids content of said resole solution is in the range from about 40% to about 48%.

40. The composition of claim 39 wherein the number average molecular weight of said resin is from 1500 to 2500.

* * * * *

UNITED STATES PATENT AND TRADEMARK OFFICE
CERTIFICATE OF CORRECTION

PATENT NO. : 4,758,478
DATED : July 19, 1988
INVENTOR(S) : Daisy et al.

It is certified that error appears in the above-identified patent and that said Letters Patent is hereby corrected as shown below:

ON THE COVER PAGE

Add the following:
-- Assignee: Borden, Inc., Columbus, Ohio --
-- Attorney, Agent or Firm - Robbins & Laramie--

IN THE ABSTRACT

In Line 5 correct the spelling of phenolic

IN THE CLAIMS

In Claim 1, column 17 line 9, correct the spelling of least

In claim 14, change the dependency of the claim to the following:

--14. The process of claim 13--

Signed and Sealed this

Twenty-eighth Day of February, 1989

Attest:

DONALD J. QUIGG

Attesting Officer

Commissioner of Patents and Trademarks